United States Patent
Walker et al.

(10) Patent No.: US 12,033,300 B2
(45) Date of Patent: Jul. 9, 2024

(54) SYSTEMS, METHODS, AND DEVICES FOR VIDEO DATA SCALING IN MULTI-WINDOW DISPLAYS

(71) Applicant: RGB SPECTRUM, Alameda, CA (US)

(72) Inventors: Clive Walker, Alameda, CA (US); Lynton Auld, Rohnert Park, CA (US); Scott Norder, Oakland, CA (US)

(73) Assignee: RGB SPECTRUM, Alameda, CA (US)

( * ) Notice: Subject to any disclaimer, the term of this patent is extended or adjusted under 35 U.S.C. 154(b) by 154 days.

(21) Appl. No.: 17/068,568

(22) Filed: Oct. 12, 2020

(65) Prior Publication Data
US 2022/0116660 A1   Apr. 14, 2022

(51) Int. Cl.
| | |
|---|---|
| *G06T 3/40* | (2024.01) |
| *H04N 9/31* | (2006.01) |
| *H04N 19/44* | (2014.01) |
| *H04N 19/46* | (2014.01) |
| *H04N 19/61* | (2014.01) |
| *H04N 21/2662* | (2011.01) |

(52) U.S. Cl.
CPC .............. *G06T 3/40* (2013.01); *H04N 19/44* (2014.11); *H04N 19/46* (2014.11); *H04N 19/61* (2014.11); *H04N 9/3188* (2013.01); *H04N 21/2662* (2013.01)

(58) Field of Classification Search
None
See application file for complete search history.

(56) References Cited

U.S. PATENT DOCUMENTS

| | | | | |
|---|---|---|---|---|
| 6,417,866 B1* | 7/2002 | Man | ................. | G06T 3/0018 345/671 |
| 6,600,785 B1* | 7/2003 | Nishigori | ............... | H04N 19/61 375/240.23 |
| 9,716,854 B2* | 7/2017 | Van Rassell | .......... | G09G 5/393 |

(Continued)

FOREIGN PATENT DOCUMENTS

| | | | | | |
|---|---|---|---|---|---|
| CN | 101636762 A | * | 1/2010 | .......... | G06F 3/0481 |
| WO | 2022081419 A1 | | 4/2022 | | |

OTHER PUBLICATIONS

Int'l Application Serial No. PCT/US21/54062, ISR/WO mailed Jan. 14, 2022. 8 pgs.

(Continued)

Primary Examiner — Mohammed Jebari
(74) Attorney, Agent, or Firm — Kwan & Olynick LLP

(57) ABSTRACT

System, methods, and devices provide scaling for multi-window displays. Systems include decoders configured to decode a plurality of media streams, wherein each of the plurality of media streams includes a plurality of frames each comprising video data. Systems further include memory devices configured to store a plurality of unscaled frames included in the plurality of frames and received from the decoder, and processing devices configured to generate a plurality of display parameters based, at least in part, on the plurality of media streams. Systems also include a plurality of scalers configured to identify frames to be scaled based on the plurality of display parameters, further configured to scale the identified plurality of frames based on a plurality of scaling parameters. Systems further include encoders configured to encode at least some of the plurality of scaled frames into one or more media steams.

16 Claims, 10 Drawing Sheets

(56) References Cited

U.S. PATENT DOCUMENTS

| | | | |
|---|---|---|---|
| 2005/0157164 A1* | 7/2005 | Eshkoli | H04N 7/152 |
| | | | 348/14.09 |
| 2005/0196051 A1* | 9/2005 | Wong | G06F 21/10 |
| | | | 382/232 |
| 2006/0093037 A1* | 5/2006 | Enomoto | H04N 21/4312 |
| | | | 375/E7.193 |
| 2008/0079757 A1* | 4/2008 | Hochmuth | G09G 5/003 |
| | | | 345/698 |
| 2008/0084927 A1 | 4/2008 | Rosenzweig et al. | |
| 2009/0067753 A1* | 3/2009 | Hanechak | G06T 3/0006 |
| | | | 382/298 |
| 2010/0166062 A1* | 7/2010 | Perlman | H04N 21/658 |
| | | | 382/239 |
| 2011/0019936 A1* | 1/2011 | Bhrugumalla | H04N 5/23218 |
| | | | 382/298 |
| 2013/0156113 A1 | 6/2013 | Ismael-Mia et al. | |
| 2017/0132754 A1* | 5/2017 | Mody | H04N 1/393 |
| 2017/0353523 A1 | 12/2017 | Mimar et al. | |
| 2021/0366359 A1* | 11/2021 | Hong | G09G 3/32 |

OTHER PUBLICATIONS

International Preliminary Report on Patentability, Application No. PCT/US2021/054062, dated Apr. 27, 2023, 7 pages.

* cited by examiner

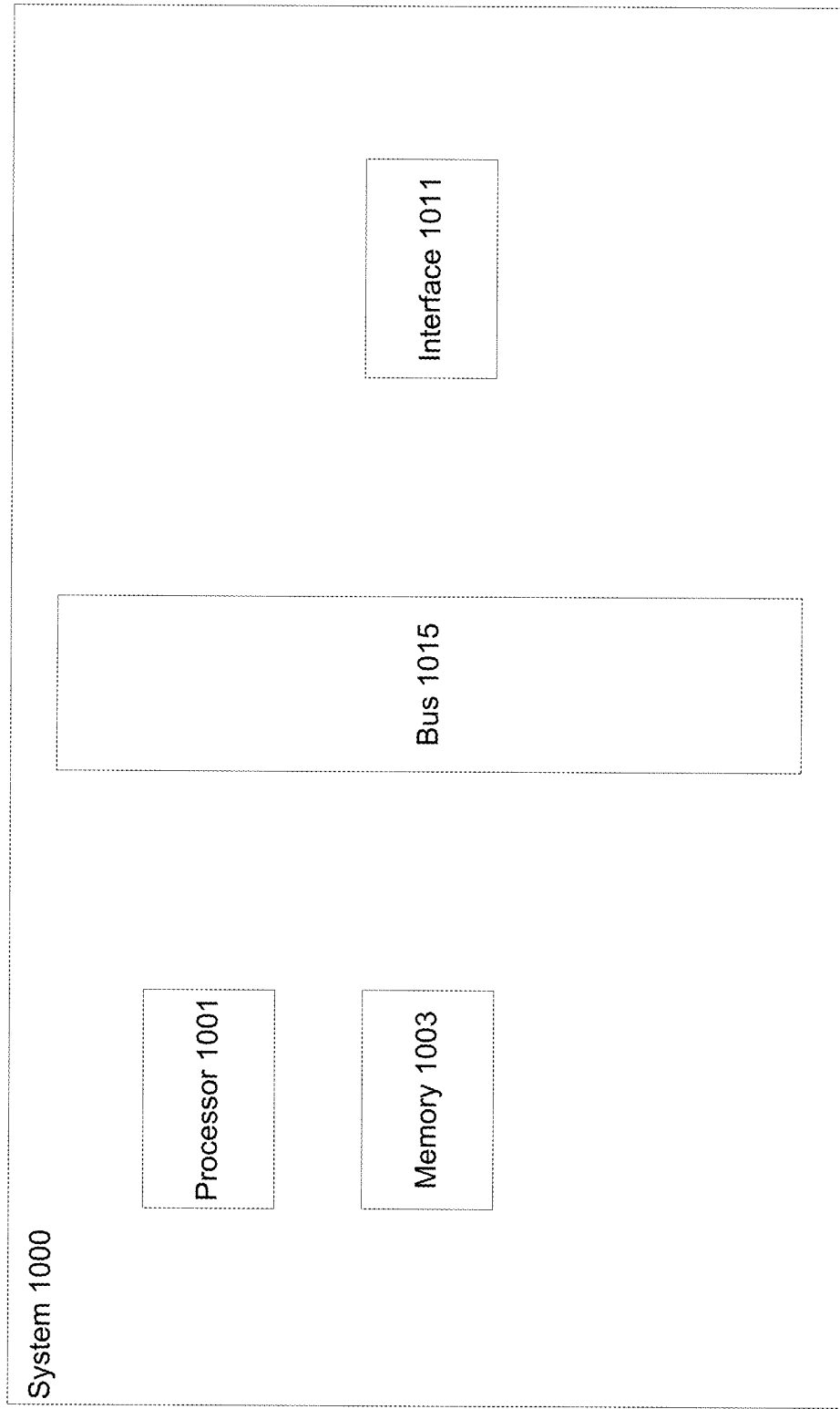

SYSTEMS, METHODS, AND DEVICES FOR VIDEO DATA SCALING IN MULTI-WINDOW DISPLAYS

TECHNICAL FIELD

The present disclosure relates to the field of video data transmission, and more particularly to scaling of displays of such video data.

DESCRIPTION OF RELATED ART

Digital media content may include audio and visual information that may be rendered and displayed at display devices. Such digital media content may be transmitted over a communications network for display at a target display device. Accordingly, a transmitter may generate a media stream that is a stream of data that represents the digital media content. The media stream may be transmitted over the communications network and may be provided to one or more display units for display. While such digital media content may be transmitted over a communications network, traditional techniques are limited because they are not able to effectively scale media content in multi-source and multi-display contexts.

SUMMARY

Disclosed herein are systems, methods, and devices for scaling for multi-window displays. Systems include a decoder comprising one or more processors configured to decode a plurality of media streams, wherein each of the plurality of media streams includes a plurality of frames each comprising video data. Systems further include a memory device configured to store a plurality of unscaled frames included in the plurality of frames and received from the decoder, a processing device configured to generate a plurality of display parameters based, at least in part, on the plurality of media streams, and a plurality of scalers configured to identify frames to be scaled based on the plurality of display parameters, further configured to scale the identified plurality of frames based on a plurality of scaling parameters, and further configured to store the plurality of scaled frames received in the memory device. Systems also include an encoder comprising one or more processors configured to encode at least some of the plurality of scaled frames into one or more media steams.

In some embodiments, the processing device is further configured to generate a plurality of priority parameters based on the display parameters, and generate the plurality of scaling parameters based on the priority parameters. In various embodiments, the plurality of priority parameters includes a priority map and a priority table, the priority table is generated based, at least in part, on a priority map, the priority map is configured to represent relationships between windows displayed on a display device as priority levels, and the priority table assigns at least some of the plurality of scalers to at least some of the windows based on the priority map. According to some embodiments, the priority map is configured to represents the priority levels are determined based, at least in part, on windows overlapping and an order of overlapping windows.

In some embodiments, the processing device is further configured to update the priority map based on a change in the order of overlapping windows. In various embodiments, systems further include a buffer configured to store the priority table. According to some embodiments, the plurality of scalers is implemented in a reprogrammable logic device, and wherein a number of the plurality of scalers is dynamically configurable. In some embodiments, each of the plurality of scalers is configured to apply upscaling or downscaling to video data included in the plurality of frames. In various embodiments, the plurality of media streams is displayed on multiple display devices.

Methods are also disclosed herein that include receiving a plurality of media streams, wherein each of the plurality of media streams includes a plurality of frames each comprising video data, generating, using a processing device, a plurality of display parameters based on the plurality of media streams, identifying at least some of the plurality of frames to be scaled based on the plurality of display parameter, and generating, using the processing device, a plurality of scaled frames by scaling the identified frames based, at least in part, on the plurality of scaling parameters. Methods further include storing the plurality of scaled frames in a memory device.

In some embodiments, methods further include generating a plurality of priority parameters based on the display parameters, and generating the plurality of scaling parameters based on the priority parameters. In various embodiments, methods additionally include generating, using the processing device, a priority table based, at least in part, on the plurality of media streams, wherein the priority table is generated based, at least in part, on a priority map, and wherein the priority map is configured to represent relationships between windows displayed on a display device as priority levels. According to some embodiments, the priority table assigns at least some of a plurality of scalers to at least some of the windows based on the priority map. In some embodiments, the priority map is configured to represent the priority levels based, at least in part, on windows overlapping and an order of overlapping windows. In various embodiments, methods further include decoding, using one or more processors of a decoder, the plurality of media streams. According to some embodiments, methods additionally include encoding, using one or more processors of an encoder, at least some of the plurality of scaled frames into one or more media steams.

Further disclosed herein are devices that include a processing device configured to generate a plurality of display parameters based, at least in part, on a plurality of media streams, wherein each of the plurality of media streams includes a plurality of frames each comprising video data. Devices further include a plurality of scalers configured to identify frames to be scaled based on the plurality of display parameters, and further configured to scale the identified plurality of frames based on a plurality of scaling parameters. Devices additionally include a memory device configured to store a plurality of unscaled frames included in the plurality of frames received from a decoder, the memory device being further configured to store a plurality of scaled frames received from the plurality of scalers, and the memory device being further configured to provide the plurality of scaled and unscaled frames to an encoder.

In some embodiments, the processing device is further configured to generate a plurality of priority parameters based on the display parameters, and generate the plurality of scaling parameters based on the priority parameters. In various embodiments, the plurality of priority parameters comprise a priority map and a priority table, wherein the priority table is generated based, at least in part, on a priority map, wherein the priority map is configured to represent relationships between windows displayed on a display device as priority levels, and wherein the priority table assigns at least some of the plurality of scalers to at least some of the windows based on the priority map. According to some embodiments, the processing device is further configured to update the priority map based on a change in an order of overlapping windows.

BRIEF DESCRIPTION OF THE DRAWINGS

FIG. 10 illustrates an example of a processing system, configured in accordance with some embodiments.

DETAILED DESCRIPTION

Reference will now be made in detail to some specific examples including the best modes contemplated by the inventors. Examples of these specific embodiments are illustrated in the accompanying drawings. While particular embodiments are described, it will be understood that they are not intended to be limiting. On the contrary, they are intended to cover alternatives, modifications, and equivalents as may be included within the spirit and scope of the disclosure as defined by the appended claims.

Digital media content may be transmitted as media streams across a distributed environment. Accordingly, such media streams may be transmitted from various different locations to various different locations, and ultimately displayed at one or more display devices. In various embodiments, multiple media streams may be provided to multiple display windows of display devices to be presented as a single unified display. Accordingly, a display device, also described as a display unit, may include a display space that is a viewable area in a display device. Moreover, each display space may support multiple display windows that may each be provided a media stream. As will be discussed in greater detail below, embodiments disclosed herein provide the ability to implement scaling for multiple media streams associated with multiple display devices in a manner that reduces a processing requirement and overhead imposed on the available scaling resources and associated hardware resources.

Figure 1:
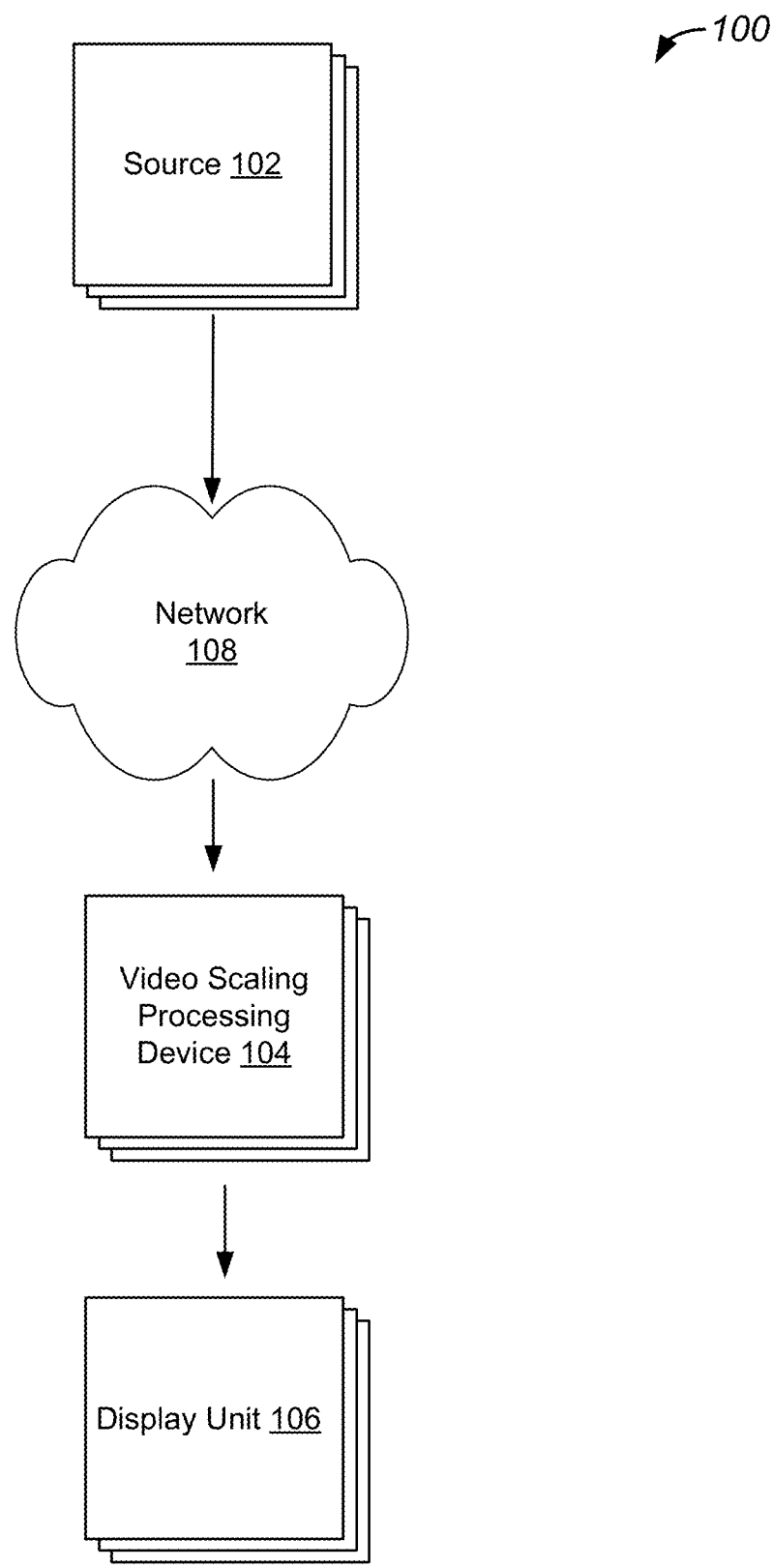
FIG. 1 illustrates an example of a system for implementing video data scaling, configured in accordance with some embodiments.

FIG. 1 illustrates an example of a system for implementing video data scaling, configured in accordance with some embodiments. As will be discussed in greater detail below, systems, such as system 100, are configured to implement scaling for various media streams in a manner that efficiently allocates scaling resources based on one or more parameters associated with a target display. Accordingly, system 100 provides the ability to implement scaling for multiple media streams displayed in a display unit with a reduced requirement and overhead imposed on the available scaling resources and associated hardware resources.

Accordingly, system 100 includes various sources, such as source 102, which are configured to generate and transmit one or more media streams. Accordingly, a source, such as source 102 may be a processing device configured as a transmitter that is configured to encode a media stream for transmission to one or more downstream components of system 100. For example, the media streams may be transmitted via a network, such as network 108. In various embodiments, network 108 is a communications network or other computer network, such as the internet. Each of the media streams may include video and audio data that has been packetized for network transmission. As shown in FIG. 1, system 100 may include multiple sources. Accordingly, multiple media streams may be transmitted via network 108 using multiple different sources that may be implemented at a particular location, or in a distributed manner at multiple different locations in different processing devices.

System 100 further includes display unit 106 which is configured to display video data included in the media streams. Accordingly, as discussed above, video data may include various frames that are displayed in display unit 106 in accordance with one or more media stream parameters, such as a frame rate. Each frame may have one or more video parameters, such as a display resolution. Each frame may also include video data that is to be displayed for a particular frame of the video stream. As will be discussed in greater detail below, display unit 106 may be configured to simultaneously display multiple different media streams in one or more display windows. Accordingly, display unit 106 is configured to support the display of different windows in a same display device, and such display windows may be movable and resizable. Moreover, such display windows may be tiled, or have an order in which one display window overlaps another. The routing information associating a media stream with a particular display window may be included in the media stream itself, and may be determined by each associated source 102.

System 100 additionally includes video scaling processing device 104. As will be discussed in greater detail below, video scaling processing device 104 is configured to scale media streams in a configurable manner such that one or more portions of media streams and their respective video data are scaled, while other portions remain unscaled. Accordingly, video scaling processing device 104 enables an increase in the efficiency of the usage of scaling resources and hardware resources by reducing an overall amount of scaling that is implemented. As will be discussed in greater detail below, the implementation of scaling may be based on priority parameters that identify priorities associated with different media streams, and implement scaling based on such identified priorities. Moreover, the implementation of scaling may be based on selective parameters that identify selections or portions of a display space that should be scaled. Moreover, video scaling processing device 104 may also be configured to implement scaling based on priority parameters or selective parameters based on one or more conditions, or may be configured to implement a combination of both. In this way, video scaling processing device 104 is configured to allocate scaling resources with increased efficiency and in a manner compatible with multiple display windows displayed in a particular display device.

As also shown in FIG. 1, system 100 may include multiple video scaling processing devices. In this way, a number of video scaling processing device utilized may be dynamically scaled based on the video scaling needs of system 100. For example, as a number of media streams increases, a number of active video scaling processing devices may be increased to handle the new media streams. Such dynamic implementation of the video scaling processing devices may be handled by a primary video scaling processing device that may be designated as a coordinator. In one example, the primary video scaling processing device is a coordinator for a cluster of video scaling processing devices. Additional details regarding video scaling processing device 104 are discussed in greater detail below with reference to FIGS. 2-7.

Figure 2:
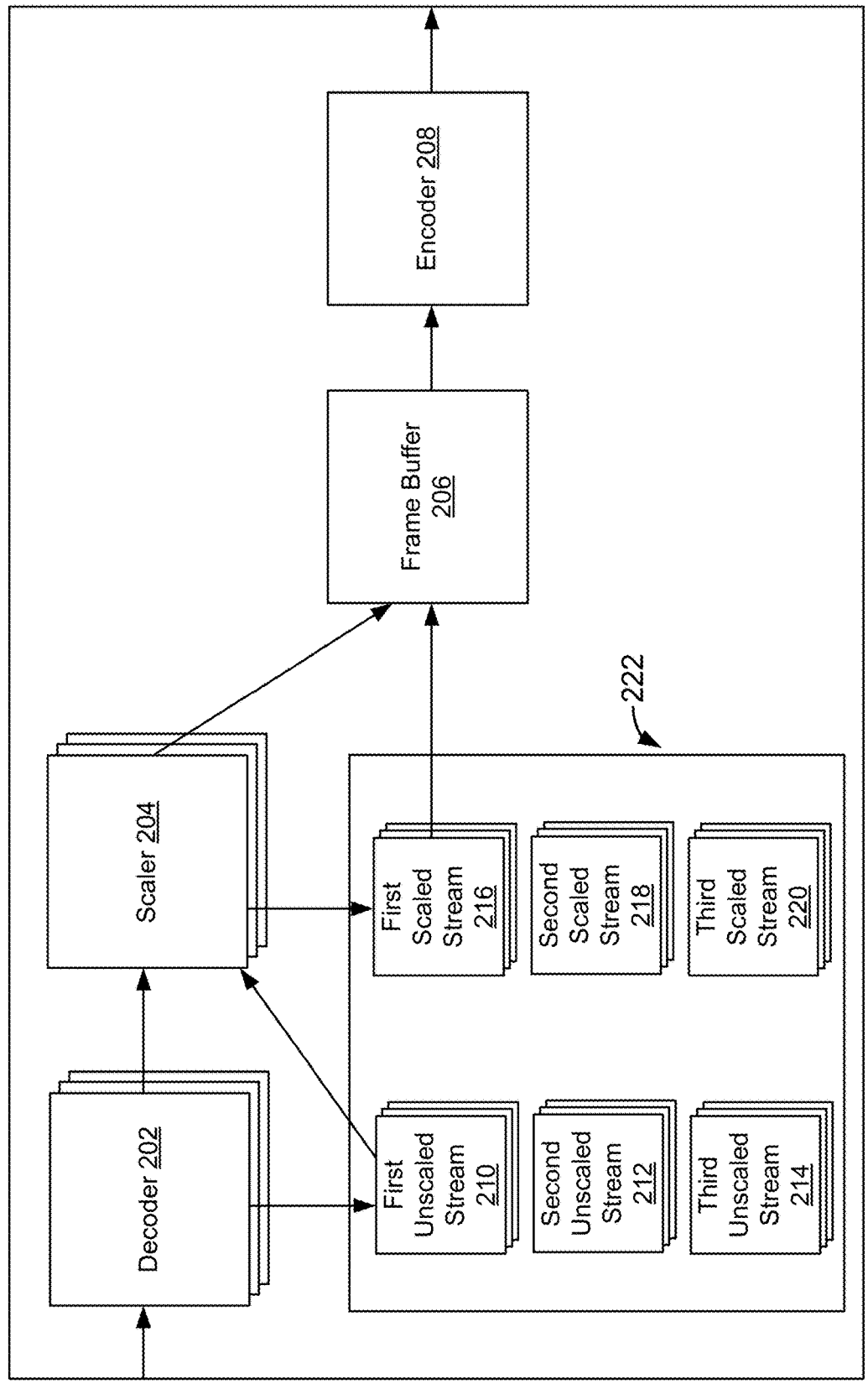
FIG. 2 illustrates another example of a system for implementing video data scaling, configured in accordance with some embodiments.

FIG. 2 illustrates another example of a system for implementing video data scaling, configured in accordance with some embodiments. As similarly discussed above, video scaling processing devices are configured to implement scaling for various media streams in a manner that efficiently allocates scaling resources based on one or more parameters associated with a target display. Moreover, a video scaling processing device, such as video scaling processing device 104, is configured to provide the ability to implement scaling for multiple media streams displayed in a display unit. Additional details regarding video scaling processing device 104 are discussed in greater detail below.

Accordingly, video scaling processing device 104 may include decoder 202 which is configured to decode one or more received media streams. As mentioned above, the received one or more media streams may have been encoded and packetized for network transmission. Accordingly, the data included in the media streams may be received via a communications interface, and may be decoded by decoder 202 to generate data values representing the originally transmitted video data. As shown in FIG. 2, decoder 202 may be communicatively coupled to one or more other components, such as memory 222 and scaler 204. Accordingly, once decoded, decoder 202 is configured to provide video data, such as a video frame to memory 222 and/or scaler 204. In this way, unscaled video data to both memory 222 and scaler 204.

As noted above, video scaling processing device 104 includes memory 222 which is a memory device configured to store various data associated with the received media streams. Accordingly, memory 222 is configured to include several data storage locations configured to store data associated with decoder 202 and scaler 204. For example, memory 222 is configured to include first, second, and third storage locations configured to store first unscaled stream 210, second unscaled stream 212, and third unscaled stream 214. Accordingly, a storage location is configured to store unscaled video frames received from decoder 202 for each media stream. Furthermore, memory 222 is additionally configured to include storage locations configured to store first scaled stream 216, second scaled stream 218, and third scaled stream 220. Accordingly, additional storage locations are configured to store scaled video frames received from scaler 204 for each media stream. In this way, memory 222 is configured to provide a storage location for both scaled and unscaled data.

As also discussed above, video scaling processing device 104 further includes various scalers, such as scaler 204. In various embodiments, scaler 204 is configured to implement one or more scaling operations on video data based on one or more scaling parameters. Such scaling operations may include scaling a resolution of a video frame or one or more other parameters, such as a bit depth or frame rate of the video frames. In one example, such scaling may include upscaling a standard definition frame (720p) to a high definition frame (1080p), or a high definition frame to a ultra-high definition frame (2160p). In another example, scaling operations may include downscaling a video frame to a lesser resolution. As will be discussed in greater detail below, the application of such scaling operations to media streams by scaler 204 may be controlled by various parameters, such as priority parameters and/or selective parameters. In this way, the usage and implementation of scaler 204 may be specifically configured based on aspects of the display of media streams on a display unit, and such configuration may be implemented dynamically. Additional details regarding the generation and usage of such priority parameters and selective parameters are discussed in greater detail below with reference to FIGS. 3-7.

In various embodiments, scalers, such as scaler 204, may be shared by multiple media streams and multiple display windows associated with such media streams. For example, a single scaler may be time-shared by multiple media streams associated with multiple display windows. In this way, scaling operations for each of the media streams may be scheduled and implemented for each scaler based on a time-division scheme. Moreover, a number of streams assigned to scaler 204 may be determined and updated dynamically.

Video scaling processing device 104 additionally includes frame buffer 206 which is configured to provide a buffer for video data that is ultimately output by video scaling processing device 104. Accordingly, frame buffer 206 is configured to have a designated buffer depth, and is further configured to provide temporary storage for video data that is provided to an encoder, such as encoder 208, prior to transmission from video scaling processing device 104. As shown in FIG. 2, frame buffer 206 is communicatively coupled to both memory 222 and scaler 204. Accordingly, frame buffer 206 is configured to receive video data from any of the storage locations of memory 222, and is further configured to receive video data directly from scaler 204.

Video scaling processing device 104 further includes encoder 208 which is configured to encode the video data stored in frame buffer 206 for transmission to a downstream component, such as a display unit. Accordingly, encoder 208 encodes the video frames, and packetizes the video data if appropriate. The encoded video data may then be transmitted to the display unit via a network, or via a direct connection. As discussed above, the output provided by encoder 208 may include multiple video streams that may be simultaneously displayed in a single display space of the display unit.

It will be appreciated that while various embodiments have been discussed with reference to encoded and decoded video data and media streams, embodiments disclosed herein may also be implemented in the context of baseband video as well. For example, point-to-point video sent from one device to another device may be received and implemented with various scalers, such as scaler 204, discussed above. In this way, embodiments disclosed herein may be implemented independent of encoders and decoders, and may be configured to provide scaling of video frames in baseband media streams as well.

Figure 3:
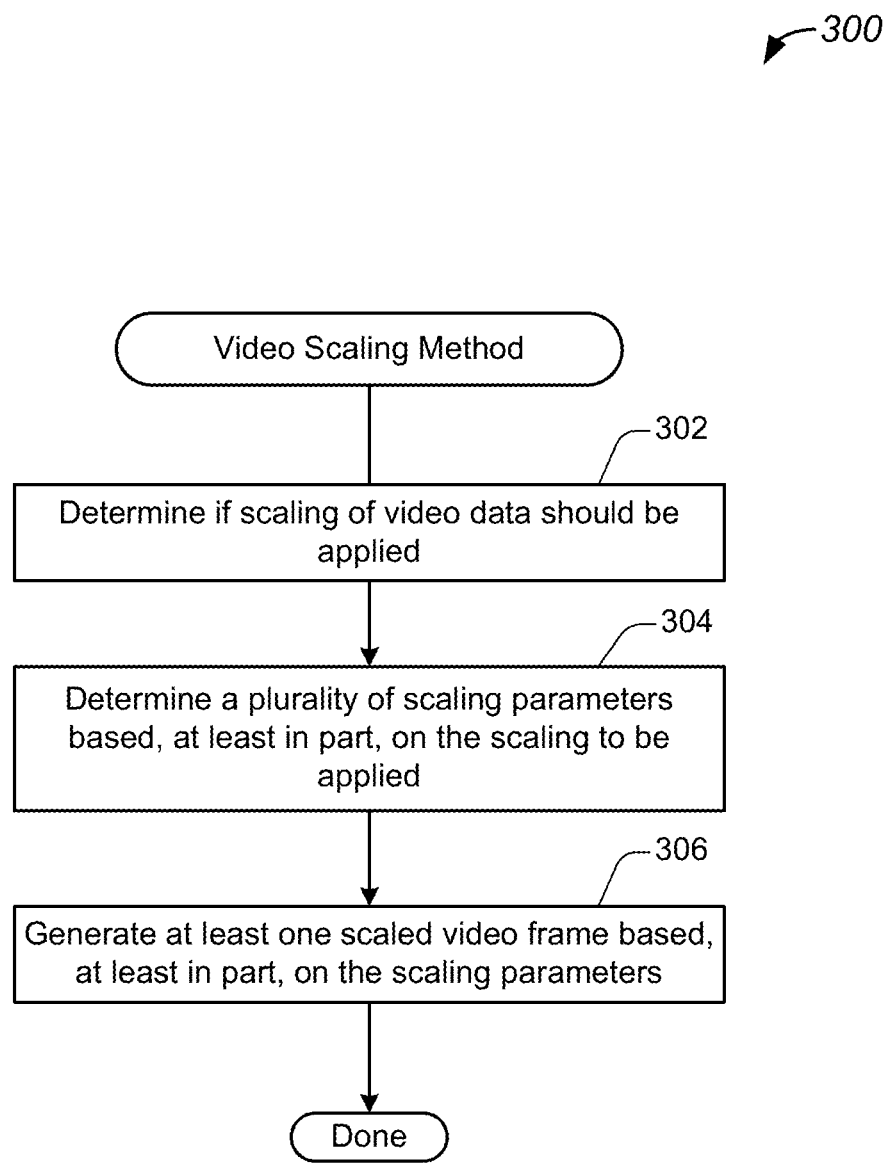
FIG. 3 illustrates a flow chart of an example of a method for video data scaling, implemented in accordance with some embodiments.

FIG. 3 illustrates a flow chart of an example of a method for video data scaling, implemented in accordance with some embodiments. As will be discussed in greater detail below, methods, such as method 300, may be implemented to scale various media streams in a manner that efficiently allocates scaling resources based on one or more parameters associated with a target display. Accordingly, method 300 provides the ability to scale multiple media streams displayed in a display unit with a reduced requirement and overhead imposed on the available scaling resources and associated hardware resources.

Method 300 may commence with operation 302 during which it may be determined if scaling should be applied to video data. As will be discussed in greater detail below, such a determination may be made based on one or more parameters, such as priority parameters and/or selective parameters. Accordingly, a designated mapping or table may have been generated that identifies which portions of video data included in a media stream are to be scaled, and which portions are not. Thus, during operation 302, particular portions of received media streams may be identified for scaling, and other portions may be identified to have no scaling applied. In some embodiments, different amounts or types of scaling may be applied. For example, during operation 302, particular portions of received media streams may be identified for a first type of scaling, and other portions may be identified to have a second type of scaling. As will be discussed in greater detail below, the second type of scaling may be a reduced scaling frame rate identified based on priority parameters.

Method 300 may proceed to operation 304 during which a plurality of scaling parameters may be determined based, at least in part, on the scaling to be applied. Accordingly, during operation 304, the portions of the video data to be scaled may be identified, and scaling parameters used to implement scaling operations may also be identified. As discussed above, such scaling parameters may identify a type and amount of scaling to be applied, such as upscaling or downscaling. Moreover, scaling parameters may also identify a frame rate of a media stream. Accordingly, a frame rate may be upscaled or downscaled. As will be discussed in greater detail below, such scaling parameters may be determined based on one or more designated parameters or one or more aspects of a target display unit and display window. For example, the scaling parameters may be identified based on a native resolution of the target display window.

Method 300 may proceed to operation 306 during which at least one video frame is generated based, at least in part, on the determined scaling parameters. Accordingly, during operation 306, scaling operations may be applied, and one or more scaled video frames may be generated in accordance with the scaling parameters. As discussed above, each scaled video frame may then be encoded and transmitted to a downstream component, such as a display unit. It will be appreciated that if no scaling is to be applied, an unscaled video frame may be generated and transmitted.

Figure 4:
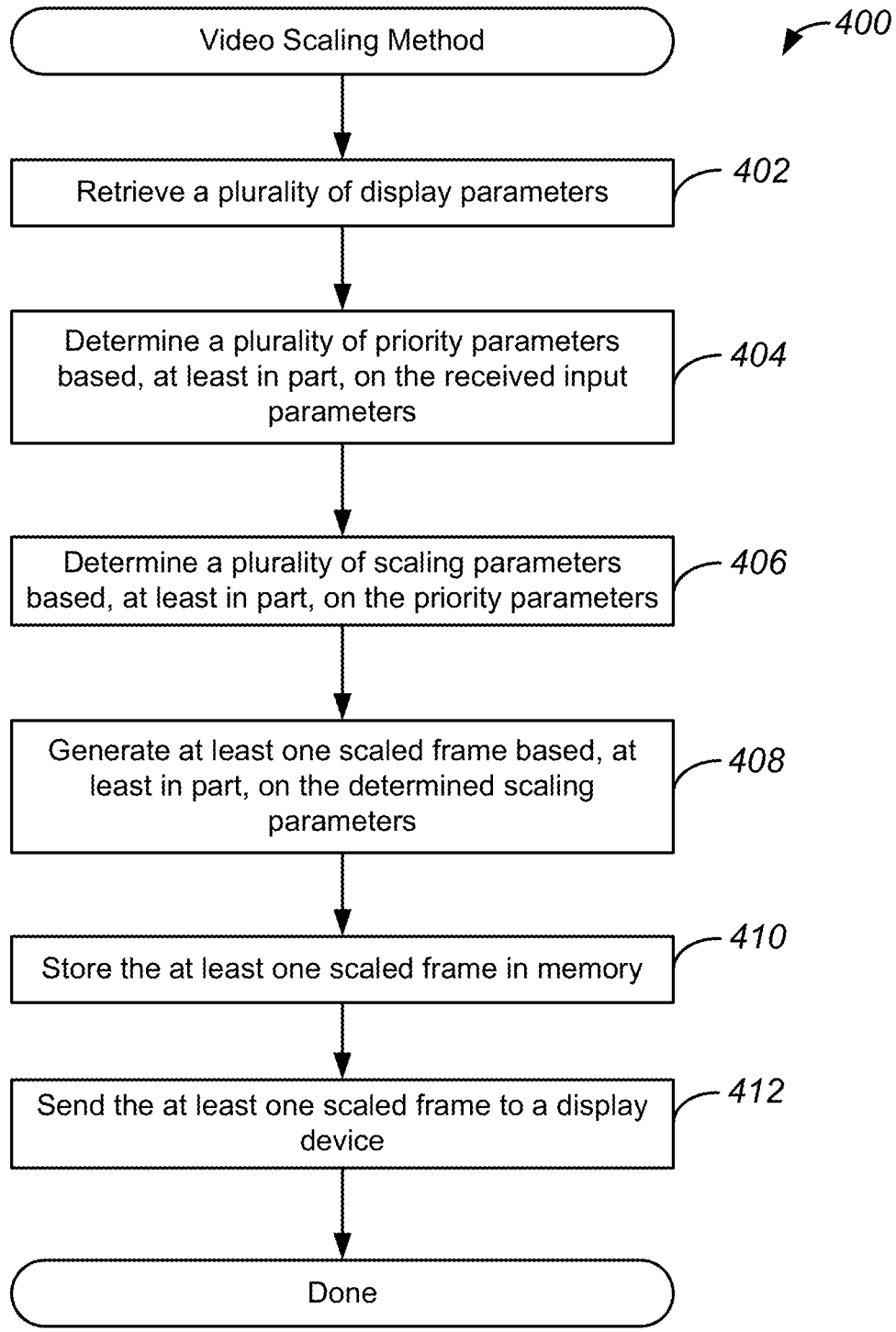
FIG. 4 illustrates a flow chart of another example of a method for video data scaling, implemented in accordance with some embodiments.

FIG. 4 illustrates a flow chart of another example of a method for video data scaling, implemented in accordance with some embodiments. As will be discussed in greater detail below, methods, such as method 400, may be implemented to scale various media streams in a manner that efficiently allocates scaling resources based on one or more parameters associated with a target display. More specifically, method 400 provides the ability to scale multiple media streams in accordance with a priority mapping for multiple media streams. In this way, priorities may be assigned to various media streams, and scaling may be dynamically applied in accordance with such designated priorities.

Method 400 may commence with operation 402 during which a plurality of display parameters may be retrieved. In various embodiments, the display parameters may be parameters that represent one or more aspects of display windows displayed on a display unit. For example, the display parameters may identify particular media streams using one or more unique identifiers, such as a stream identifier. Moreover, the display parameters may identify display windows used to display the media streams, as well as various parameters of the display windows themselves. More specifically, the display parameters may identify an order of the windows from top to bottom. Accordingly, the display windows may be tiled or overlapping, and the display parameters may identify an order in which the display windows are arranged.

Method 400 may proceed to operation 404 during which a plurality of priority parameters may be determined based, at least in part, on the received input parameters. As will be discussed in greater detail below with reference to FIG. 5, the priority parameters are determined based, at least in part, on the plurality of display parameters retrieved during operation 402. More specifically, the priority parameters may assign a priority to each of the display windows and their respective media streams based on the identified order of display windows. In this way, priority parameters may be determined based on an order of display windows, as well as an identification of an active window, and the priority parameters may be stored in memory.

Method 400 may proceed to operation 406 during which a plurality of scaling parameters may be determined based, at least in part, on the received priority parameters. As discussed above, scaling parameters may identify a type and amount of scaling to be applied. Accordingly, the scaling parameters may identify one or more scaling operations used to scale a resolution of a video frame, or one or more other parameters of the video data. In various embodiments, the scaling parameters may be determined based on a predetermined mapping. For example, the predetermined mapping may identify a particular resolution that is to be supported for media streams having particular priorities. For example, the predetermined mapping may indicate that media streams having a priority of 1 may be displayed at a resolution of 1080p, and media streams having a priority of 2 and 3 may be displayed at a resolution of 720p. In this example, the priority of 1 may identify a top display window, and may be afforded the most resolution and scaling resources. In this way, the scaling parameters may be determined based on a predetermined mapping, and particular scaling parameters may be identified based on a mapping of the priority parameters to the scaling parameters.

Method 400 may proceed to operation 408 during which at least one scaled frame may be generated based, at least in part, on the determined scaling parameters. Accordingly, a component of the video scaling processing device, such as a scaler, may be used to apply at least one identified scaling operation to a received frame, and a scaled frame may be generated. As discussed above, the scaled frame may have been upscaled or downscaled based on the identified scaling operation. Accordingly, the generated scaled frame may have resolution that is different than the initially received frame.

Method 400 may proceed to operation 410 during which the at least one scaled frame may be stored in memory.

Accordingly, the at least one scaled frame generated by the video scaling processing device may be stored in a storage location of a memory device, as discussed above with reference to FIG. 2. In some embodiments, the at least one scaled frame may be stored at a storage location specific to the media stream that includes the at least one scaled frame. As also discussed above, the at least one scaled frame may be accessible by other components of the video scaling processing device.

Method 400 may proceed to operation 412 during which the at least one scaled frame may be sent to a display device. Accordingly, the at least one scaled frame may be sent to a display unit, and the display unit may display the at least one scaled frame in a display window in a display device. In this way, as similarly discussed above, the at least one scaled frame may be displayed as a frame within a video stream displayed in the display window, and scaled in accordance with the scaling operations described above.

Figure 5:
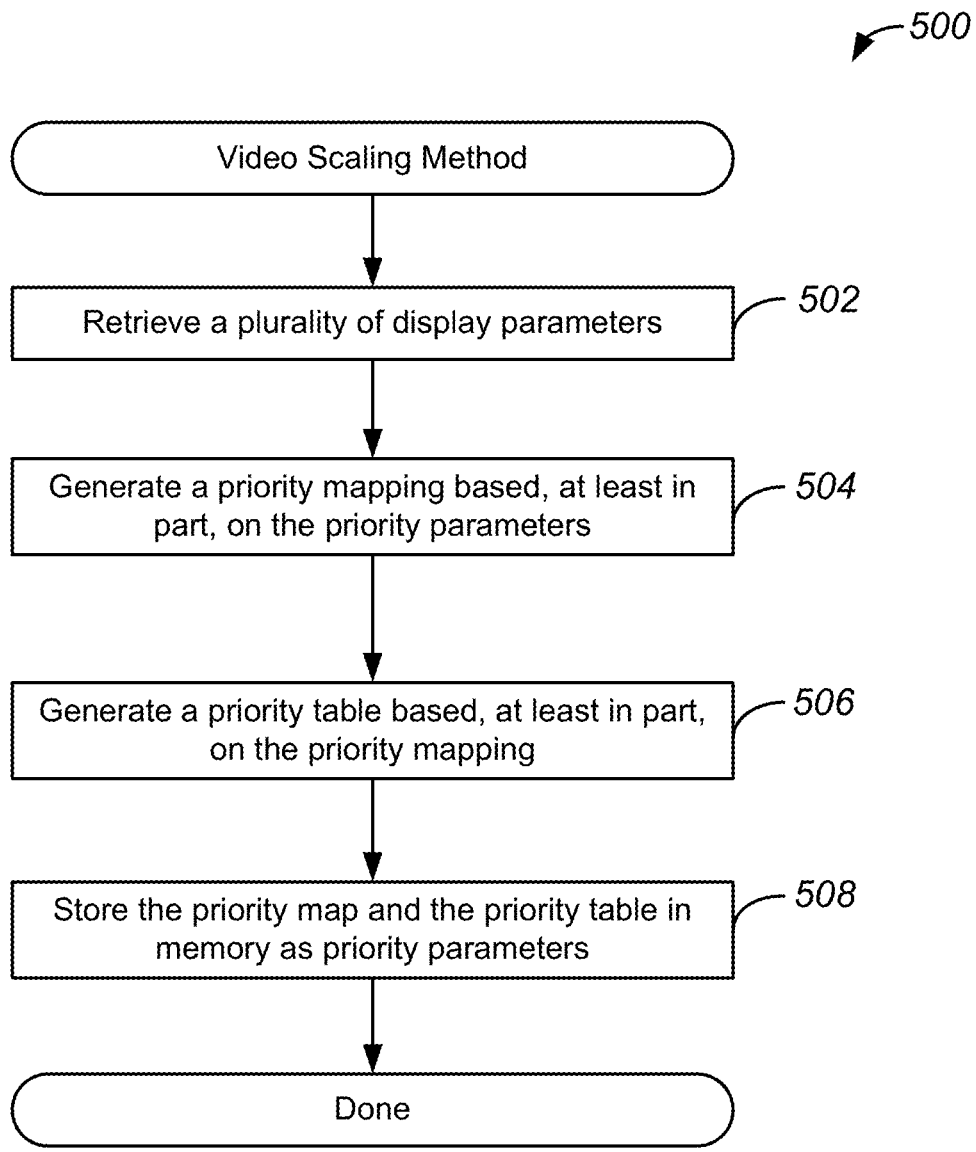
FIG. 5 illustrates a flow chart of yet another example of a method for video data scaling, implemented in accordance with some embodiments.

FIG. 5 illustrates a flow chart of yet another example of a method for video data scaling, implemented in accordance with some embodiments. As discussed above, scaling may be implemented in accordance with a priority mapping for multiple media streams. As will be discussed in greater detail below, methods, such as method 500, may be implemented to generate priority parameters that are used to implement the scaling discussed above. In a specific example, a priority mapping and a priority table may be used to generate priority parameters that enable the scaling discussed above.

Method 500 may commence with operation 502 during which a plurality of display parameters may be retrieved. As discussed above, the display parameters may be parameters that represent one or more aspects of display windows displayed on a display unit. Accordingly, the display parameters may identify display windows used to display the media streams, as well as various parameters of the display windows themselves. Moreover, the display parameters may identify an order of the windows from top to bottom. As noted above, the display windows may be tiled or overlapping, and the display parameters may identify an order in which the display windows are arranged.

Method 500 may proceed to operation 504 during which a priority map may be generated based, at least in part, on the retrieved display parameters. In various embodiments, the priority map is a data structure configured to map display windows to some representation of an order or hierarchy inferred based on their relationship while being displayed at a display unit. For example, unique identifiers may be used to map the display windows to priorities based on their order from top to bottom if the display windows are tiled and/or overlap in the display of the display unit. In this example, a top window may be given a priority of "1" while display windows underneath may be assigned priorities of "2", "3", and "4" based on their order. Accordingly, the priority map may be configured to map each of the display windows and their respective media stream to a priority based, at least in part, on the current arrangement of display windows in the display unit.

Method 500 may proceed to operation 506 during which a priority table may be generated based, at least in part, on the priority map. In various embodiments, the priority table is configured to identify how scaling resources are to be utilized and applied based on a designated priority. Accordingly, the priority table may be a data structure configured to map a designated priority to whether or not a scaler is to be utilized, as may be represented by a flag, and a particular type of scaler or operation performed by a scaler that is supported. In this way, the assignment and usage of scalers may be configured based on the data values stored in the priority table. In one example, scalers may be made available for priorities "1" and "2", but not "3" and "4". In various embodiments, the assignment of resources represented by the priority table may be implemented based on one or more designated parameters, such as user-defined configuration parameters. In one example, the assignment of resources may be implemented based, at least in part, on an availability of resources determined by the video scaling processing device. Accordingly, the video scaling processing device may dynamically assign available scalers to different priorities until none are left. As discussed above, the assigning of available scalers may be implemented on a video channel or media stream basis, or may be implemented on a frame-by-frame basis, or a combination of both. In some embodiments, the priority map may be used to determine other aspects of a media stream as well. For example, the priority map may also be used to assign a particular type of encoding.

Method 500 may proceed to operation 508 during which the priority map and the priority table may be stored in memory as priority parameters. Accordingly, the priority map and the priority table may be stored in a data structure as priority parameters, and the priority parameters may be stored in a storage location of a memory device, as discussed above with reference to FIG. 2. In some embodiments, the priority map and the priority table may be stored along with identifiers that identify media streams currently associated with the priority map and the priority table. Moreover, the priority map and the priority table may be stored as data objects linked to the storage locations associated with those identified media streams.

Figure 6:
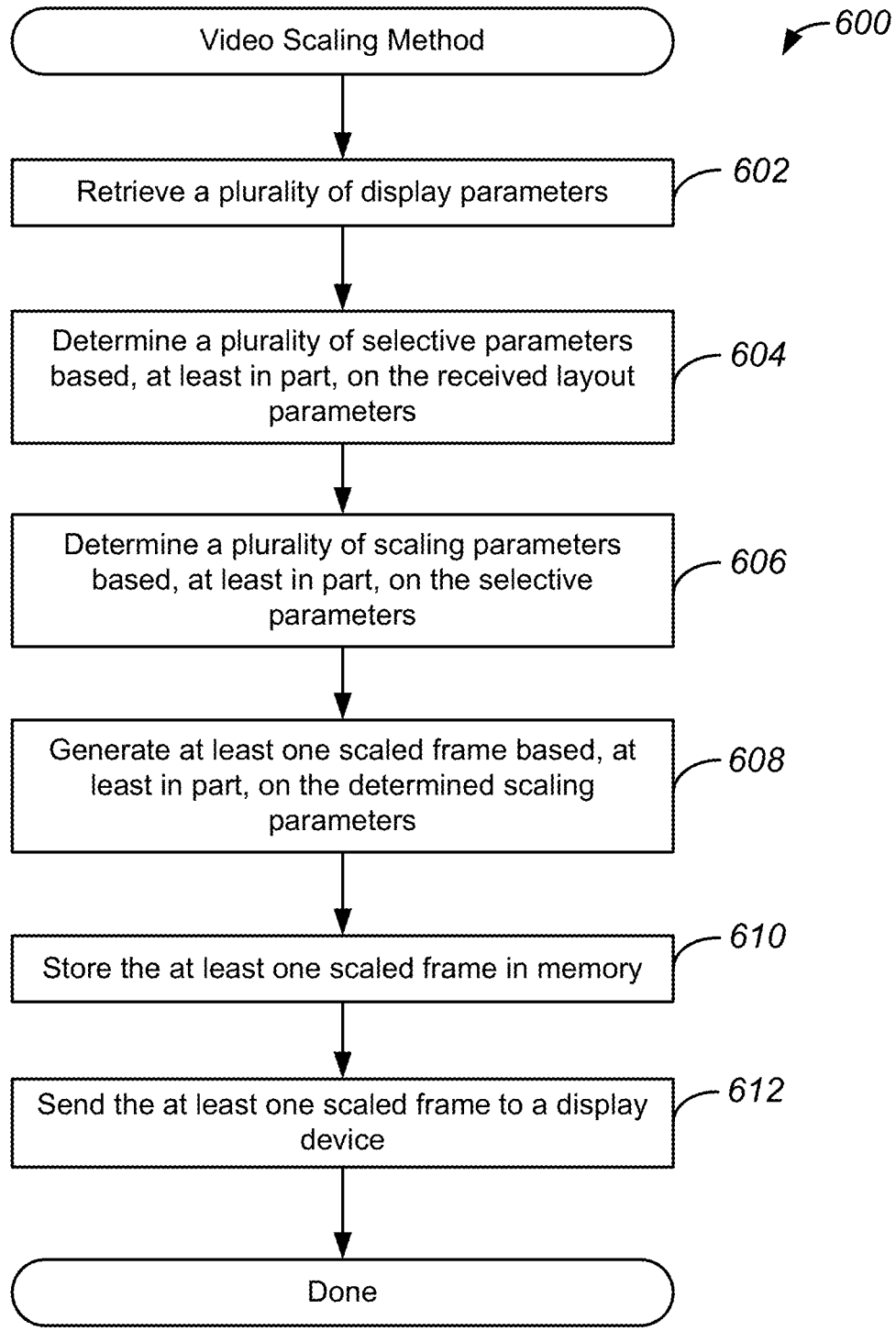
FIG. 6 illustrates a flow chart of an additional example of a method for video data scaling, implemented in accordance with some embodiments.

FIG. 6 illustrates a flow chart of an additional example of a method for video data scaling, implemented in accordance with some embodiments. As will be discussed in greater detail below, methods, such as method 600, may be implemented to scale various media streams in a manner that efficiently allocates scaling resources based on one or more parameters associated with a target display. More specifically, method 600 provides the ability to scale multiple media streams in accordance with selective parameters determined based, at least in part, on usage of a display space of a display unit. In this way, scaling may be dynamically applied in accordance with usage of a display space of a display unit.

Method 600 may commence with operation 602 during which a plurality of display parameters may be received. As discussed above, the display parameters may be parameters that represent one or more aspects of display windows displayed on a display unit. Accordingly, the display parameters may identify display windows used to display the media streams, as well as various parameters of the display windows themselves. In various embodiments, the display parameters are configured to identify whether or not a portion of a display window is visible in a display area of a display unit. For example, the display parameters may identify aspects of an arrangement of the display windows such as an order, a size, and a location with respect to each other and the display area of the display unit. In various embodiments, the video scaling processing device may have access to such information based on configuration parameters, that may have been specified by a user, when instantiating the display windows and initiating the media streams.

Method 600 may proceed to operation 604 during which a plurality of selective parameters may be determined based, at least in part, on the received display parameters. In various embodiments, the selective parameters are configured to identify portions of a visible display area of the display unit as well as a type and amount of scaling to be applied for each visible portion. For example, the display area of the display unit may be subdivided into different regions based on a location and order of different display windows. The subdivided areas may each be assigned an amount of scaling, as will be discussed in greater detail below. Accordingly, during operation 604, the selective parameters may be configured to define a plurality of regions or portions of the display area, as well as identify aspects of at least one display window associated with those portions.

For example, a bottom display window may have a portion occluded by a top display window because the bottom display window is behind the top display window. Accordingly, the visible display area may be divided into multiple different portions, which may be rectangles, to identify the visible portions of the bottom display window. As will be discussed in greater detail below, this may enable scaling to be applied to the visible portions, and omitted for the non-visible and occluded portions of the bottom display window. As similarly discussed above, different amounts or types of scaling may be applied. Thus, non-visible and occluded portions may receive a different amount of scaling, which may also include downscaling of a frame rate.

Method 600 may proceed to operation 606 during which a plurality of scaling parameters may be determined based, at least in part, on the received selective parameters. As discussed above, scaling parameters may identify a type and amount of scaling to be applied. Accordingly, the scaling parameters may identify one or more scaling operations used to scale a resolution of at least a portion of a video frame, or one or more other parameters of the video data. In various embodiments, the scaling parameters may be determined based on a predetermined mapping. For example, the predetermined mapping may identify a particular resolution that is to be supported for particular media streams. In one example, a top display window may be assigned a first scaler, while identified portions of a bottom display window may be assigned a second scaler. In this way, the scaling parameters may be and assigned to various portions of a display area of the display unit.

Method 600 may proceed to operation 608 during which at least one scaled frame may be generated based, at least in part, on the determined scaling parameters. Accordingly, a component of the video scaling processing device, such as a scaler, may be used to apply at least one identified scaling operation to received frames for the displayed media streams, and a scaled frame may be generated. As discussed above, portions of the scaled frame may have been upscaled or downscaled based on the identified scaling operations. Accordingly, the generated scaled frame may have a resolution that is different than initially received frames.

Method 600 may proceed to operation 610 during which the at least one scaled frame may be stored in memory. Accordingly, the at least one scaled frame generated by the video scaling processing device may be stored in a storage location of a memory device, as discussed above with reference to FIG. 2. In some embodiments, the at least one scaled frame may be stored at a storage location specific to the media stream that includes the at least one scaled frame. As also discussed above, the at least one scaled frame may be accessible by other components of the video scaling processing device.

Method 600 may proceed to operation 612 during which the at least one scaled frame may be sent to a display device. Accordingly, the at least one scaled frame may be sent to a display unit, and the display unit may display the at least one scaled frame in a display device. In this way, as similarly discussed above, the at least one scaled frame may be displayed for video streams displayed in display windows, and scaled in accordance with the scaling operations described above.

Figure 7:
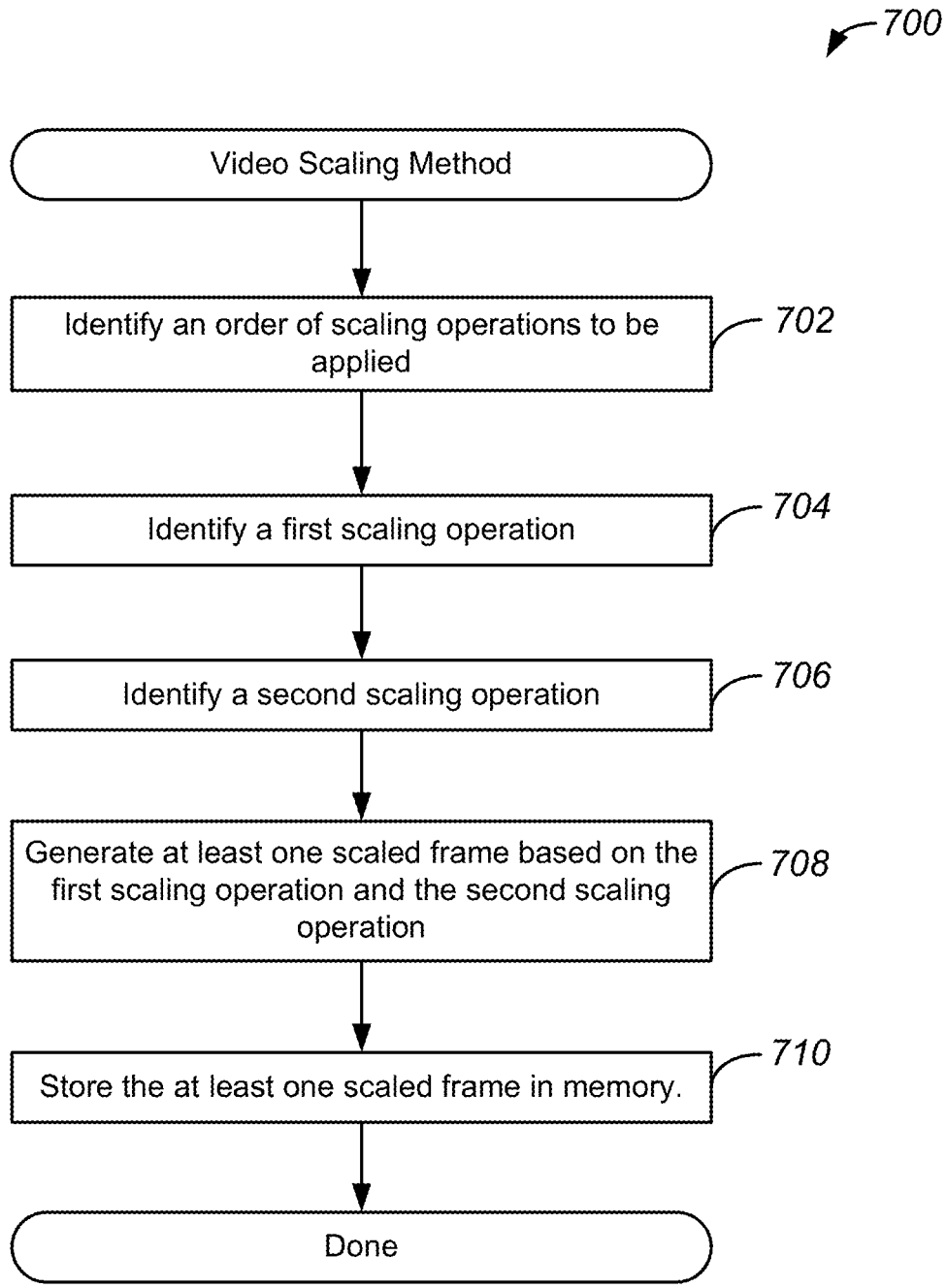
FIG. 7 illustrates a flow chart of another example of a method for video data scaling, implemented in accordance with some embodiments.

FIG. 7 illustrates a flow chart of another example of a method for video data scaling, implemented in accordance with some embodiments. As will be discussed in greater detail below, methods, such as method 700, may be implemented to scale various media streams in a manner that uses a combination of priority determinations and display usage conditions described above. Accordingly, method 700 provides the ability to scale media streams using a combination multiple different dynamic scaling modalities.

Method 700 may commence with operation 702 during which an order of scaling operations may be identified. In various embodiments, the order of scaling operations may be determined based, at least in part, on configuration parameters that may be defined by an entity, such as a user or administrator. Accordingly, the order of scaling operations may be user-defined and configurable based on a received input. In some embodiments, the order of scaling operations may be identified based on one or more display parameters. For example, an order of operations may be determined based on a number of media streams or a number of hardware resources, such as scalers, available.

Method 700 may proceed to operation 704 during which a first scaling operation may be identified. In various embodiments, the first scaling operation may be the implementation of a first scaling modality, as discussed above. For example, the first scaling operation may be the generation and implementation of priority parameters, as discussed above with reference to FIGS. 4 and 5. Accordingly, during operation 704, a first amount of scaling may be identified based on priority parameters, and based on an order of display windows associated with displayed media streams.

Method 700 may proceed to operation 706 during which a second scaling operation may be identified. In various embodiments, the second scaling operation may be the implementation of a second scaling modality, as discussed above. For example, the second scaling operation may be the generation and implementation of selective parameters, as discussed above with reference to FIG. 6. Accordingly, during operation 706, a second amount of scaling may be identified based on selective parameters, and based on a location of portions of display windows that are currently visible.

Method 700 may proceed to operation 708 during which at least one scaled frame may be generated based, at least in part, on the first scaling operation and the second scaling operation. Accordingly, a component of the video scaling processing device, such as a scaler, may be used to apply the identified scaling operations to received frames for the displayed media streams, and a scaled frame may be generated. As discussed above, portions of the scaled frame may have been upscaled or downscaled based on the identified scaling operations. Accordingly, the generated scaled frame may have a resolution that is different than initially received frames.

Method 700 may proceed to operation 710 during which the at least one scaled frame may be stored in memory. Accordingly, the at least one scaled frame generated by the video scaling processing device may be stored in a storage location of a memory device, as discussed above with reference to FIG. 2. In some embodiments, the at least one scaled frame may be stored at a storage location specific to the media stream that includes the at least one scaled frame. As also discussed above, the at least one scaled frame may be accessible by other components of the video scaling processing device.

Figure 8:
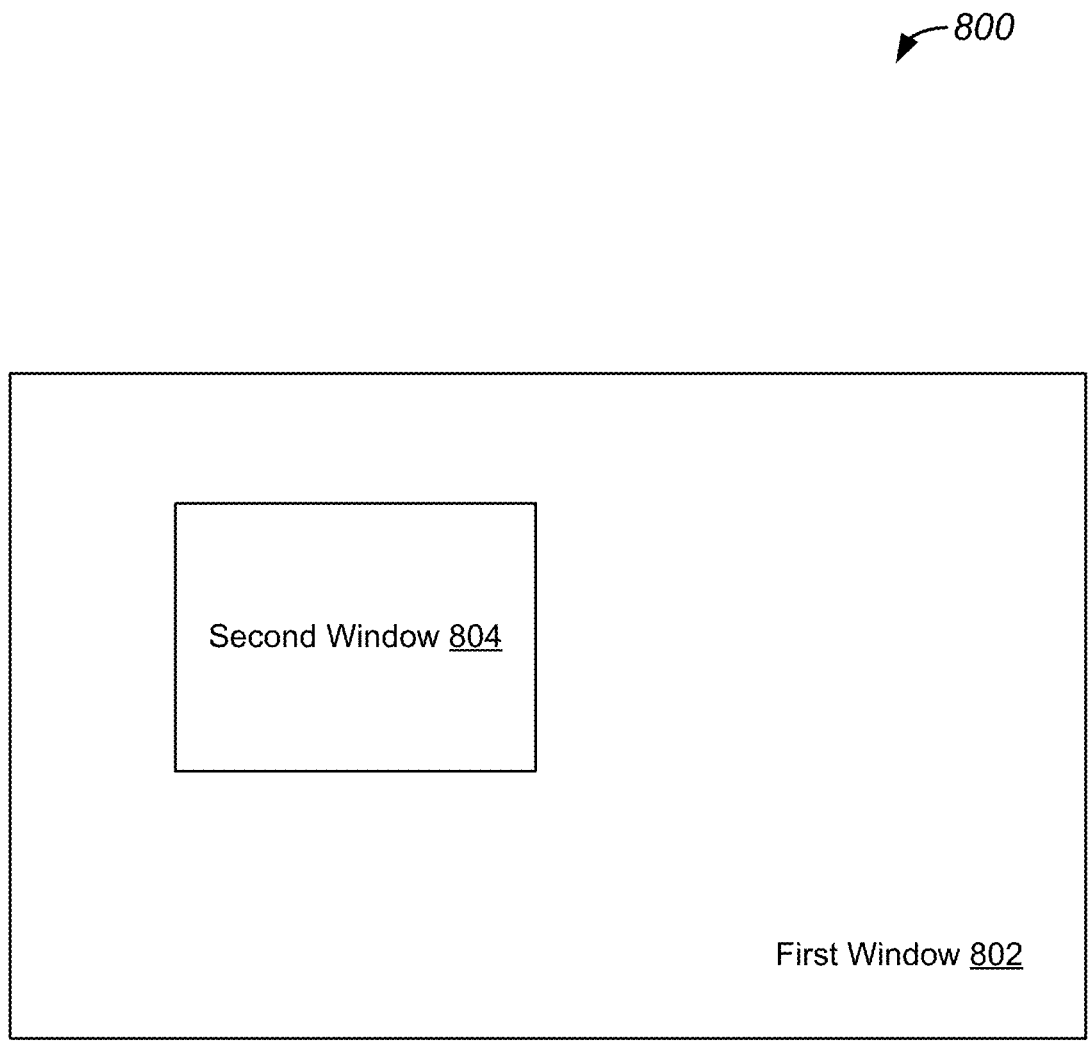
FIG. 8 illustrates a diagram of an example of a configuration of display windows, implemented in accordance with some embodiments.

FIG. 8 illustrates a diagram of an example of a configuration of display windows, implemented in accordance with some embodiments. As similarly discussed above, an arrangement of windows, such as arrangement 800, may displayed in display device of a display unit. More specifically, arrangement 800 may include first window 802 and second window 804. As shown in FIG. 8, first window 802 may be a background window, and second window 804 may be arranged on top of first window 802 as a foreground window. As discussed above, the arrangement of second window 804 on top of first window 802 may form the basis of assigning second window 804 a higher priority than first window 802, and a different amount of scaling than first window 802. Accordingly, first window 802 may receive a first amount of scaling, and second window 804 may receive a second amount of scaling.

Figure 9:
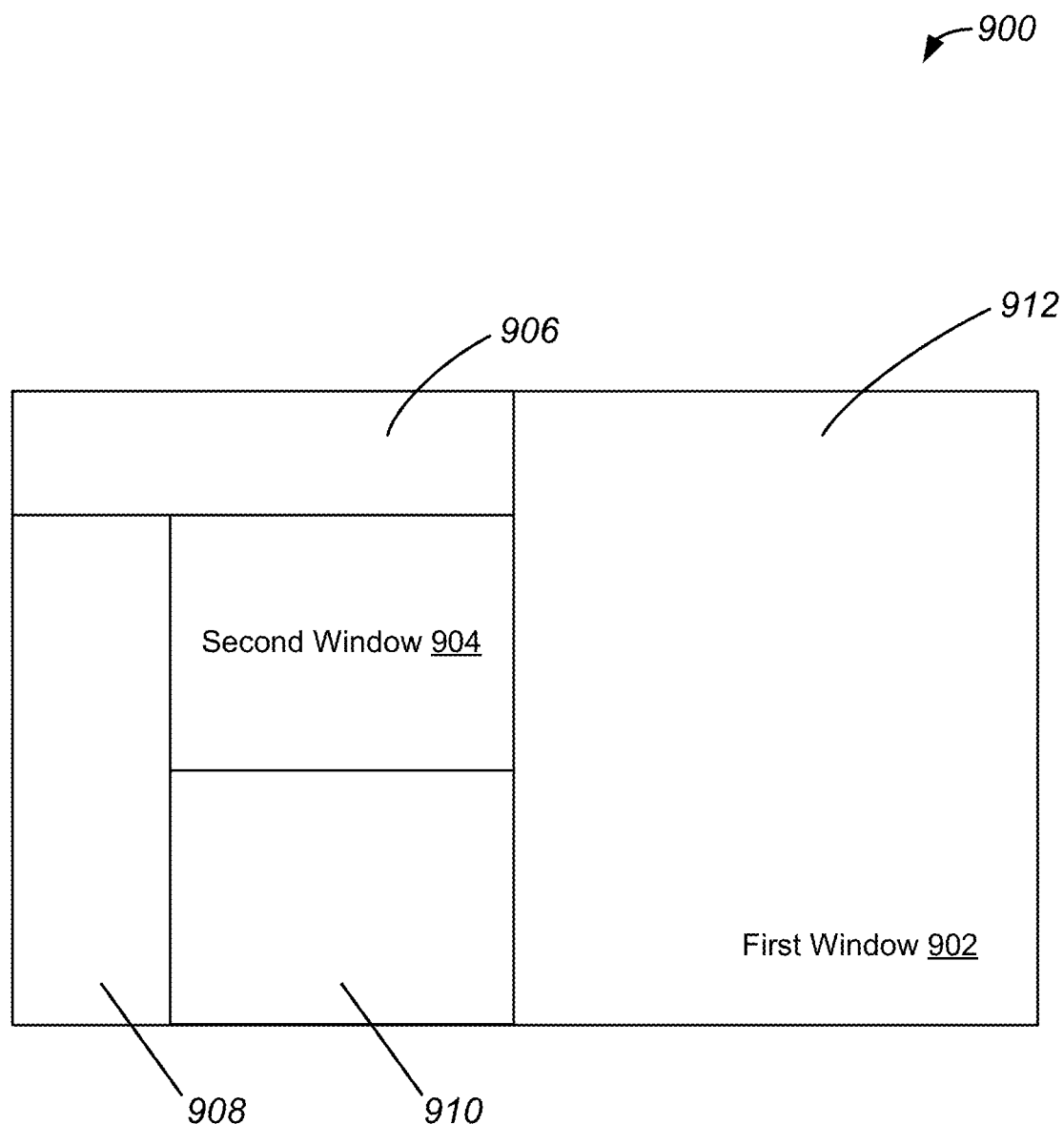
FIG. 9 illustrates a diagram of another example of a configuration of display windows, implemented in accordance with some embodiments.

FIG. 9 illustrates a diagram of another example of a configuration of display windows, implemented in accordance with some embodiments. As discussed above, an arrangement of windows, such as arrangement 900, may displayed in display device of a display unit. More specifically, arrangement 900 may include first window 902 and second window 904. As similarly discussed above, first window 902 may be a background window, and second window 904 may be arranged on top of first window 902 as a foreground window. As also discussed above, the arrangement of second window 904 on top of first window 902 may form the basis of assigning second window 904 a higher priority than first window 902, and a different amount of scaling than first window 902.

In various embodiments, the visible portion of first window 902 may be divided into several portions, such as first portion 906, second portion 908, third portion 910, and fourth portion 912. As similarly discussed above, such portions may be identified and defined using a particular geometrical shape, such as a rectangle, and available information about arrangement 900, which may be obtained from a component, such as a source or display unit. Accordingly, an amount and/or type of scaling may be applied to the visible portions, such as first portion 906, second portion 908, third portion 910, and fourth portion 912, and may be omitted for the non-visible and occluded portion that is underneath second window 904.

FIG. 10 illustrates an example of a processing system, configured in accordance with some embodiments. According to particular embodiments, a system 1000 suitable for implementing particular embodiments of the present invention includes a processor 1001, a memory 1003, an interface 1011, and a bus 1015 (e.g., a PCI bus or other interconnection fabric). In various embodiments, system 1000 may be configured to operate as one or more system components, such as video scaling processing devices, and scalers included in video scaling processing devices. When acting under the control of appropriate software or firmware, the processor 1001 is responsible for configuring and implementing video data scaling, as discussed above. Various specially configured devices can also be used in place of a processor 1001 or in addition to processor 1001. The interface 1011 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Additionally, interfaces supported may include HDMI, DisplayPort, SDi, or any other suitable port. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1000 is a video scaling processing device configured to scale video data, as discussed above. For example, the system 1000 may be configured as video scaling processing device 104 shown in FIG. 2. In various embodiments, additional instances of system 1000 may also be used to implement other components, such as a source or a display unit. More specifically, additional instances of system 1000 may also be used to implement source 102 and display unit 106 shown in FIG. 1. Although particular embodiments are described, it should be recognized that a variety of alternative configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A system comprising:
   a decoder comprising one or more processors configured to decode a plurality of media streams received from a media source over a communications network, wherein each of the plurality of media streams includes a plurality of frames each comprising video data;
   a memory device configured to store a plurality of unscaled frames included in the plurality of frames and received from the decoder;
   a plurality of scalers comprising one or more processors configured to identify frames to be scaled based on a plurality of display parameters, the display parameters determined by identifying particular aspects of a plurality of windows shown on a connected display device, further configured to scale the identified plurality of frames based on a plurality of scaling parameters, and further configured to store the plurality of scaled frames received in the memory device, wherein the plurality of scalers are shared by the plurality of video streams and the number of streams assigned to a particular scaler can be updated dynamically; and
   an encoder comprising one or more processors configured to encode at least some of the plurality of scaled frames into one or more media steams.

2. The system of claim 1, wherein the system further generates a plurality of priority parameters using the display parameters and generates the plurality of scaling parameters using the priority parameters.

3. The system of claim 2, wherein the plurality of priority parameters comprise a priority map and a priority table, wherein the priority table is generated based, at least in part, on a priority map, wherein the priority map is configured to represent relationships between windows displayed on the display device as priority levels, and wherein the priority table assigns at least some of the plurality of scalers to at least some of the windows based on the priority map.

4. The system of claim 3, wherein the priority map is configured to represents the priority levels are determined based, at least in part, on windows overlapping and an order of overlapping windows.

5. The system of claim 4, wherein the one or more processors are processing device is-further configured to update the priority map based on a change in the order of overlapping windows.

6. The system of claim 3 further comprising a buffer configured to store the priority table.

7. The system of claim 1, wherein the plurality of scalers is implemented in a reprogrammable logic device, and wherein a number of the plurality of scalers is dynamically configurable.

8. The system of claim 1, wherein each of the plurality of scalers is configured to apply upscaling or downscaling to video data included in the plurality of frames.

9. The system of claim 1, wherein the plurality of media streams is on the connected display device and an additional display device.

10. A method comprising:
    decoding a plurality of media streams received from a media source over a communications network, wherein each of the plurality of media streams includes a plurality of frames each comprising video data;
    identifying at least some of the plurality of frames to be scaled based on a plurality of display parameters, the display parameters determined by identifying particular aspects of a plurality of windows shown on a connected display device;
    encoding using a processor a plurality of scaled frames by scaling the identified frames based, at least in part, on a plurality of scaling parameters, wherein the plurality of scalers are shared by the plurality of video streams and the number of streams assigned to a particular scaler can be updated dynamically; and
    storing the plurality of scaled frames in a memory device.

11. The method of claim 10, wherein a plurality of priority parameters are generated using the display parameters and the plurality of scaling parameters are generated using the priority parameters.

12. The method of claim 11 further comprising:
    generating, using the processing device, a priority table based, at least in part, on the plurality of media streams, wherein the priority table is generated based, at least in part, on a priority map, and wherein the priority map is configured to represent relationships between windows displayed on a display device as priority levels.

13. The method of claim 12, wherein the priority table assigns at least some of a plurality of scalers to at least some of the windows based on the priority map.

14. The method of claim 13, wherein the priority map is configured to represent the priority levels based, at least in part, on windows overlapping and an order of overlapping windows.

15. The method of claim 10 further comprising:
    decoding, using one or more processors of a decoder, the plurality of media streams.

16. The method of claim 15 further comprising:
    encoding, using one or more processors of an encoder, at least some of the plurality of scaled frames into one or more media steams.

* * * * *